United States Patent

[11] 3,633,295

| [72] | Inventor | Edward J. Stropkay<br>Chesterland, Ohio |
|---|---|---|
| [21] | Appl. No. | 829,675 |
| [22] | Filed | June 2, 1969 |
| [45] | Patented | Jan. 11, 1972 |
| [73] | Assignee | Product Design & Manufacturing Corp.<br>Willoughby, Ohio |

[54] ROTATING TIRE DISPLAY
5 Claims, 3 Drawing Figs.

[52] U.S. Cl............................................. 40/33,
40/125 M, 157/13
[51] Int. Cl........................................... G09f 11/02
[50] Field of Search.......................... 40/33, 125
M; 157/13

[56] References Cited
UNITED STATES PATENTS
176,981  5/1876  Morrison..................... 40/33

| 1,664,530 | 4/1928 | Shay........................... | 40/125 M UX |
|---|---|---|---|
| 1,953,750 | 4/1934 | Dacon et al.................. | 157/13 |
| 2,035,802 | 3/1936 | George......................... | 157/13 |
| 2,069,321 | 2/1937 | McLaughlin................. | 40/125 M |
| 2,649,665 | 8/1953 | Anderson et al............. | 157/13 X |
| 2,996,110 | 8/1961 | Bosomworth et al......... | 157/13 |

Primary Examiner—Robert W. Michell
Assistant Examiner—Richard Carter
Attorney—Oberlin, Maky, Donnelly & Renner ABSTRACT: A base housing supports an automobile tire in upright condition on a drive roller which is driven by an electric motor to rotate the tire, an idler roller aligned with the drive roller, and two follower rollers in alignment and spaced circumferentially of the tire relative to the drive and idler rollers. Guide rollers associated with the follower rollers engage the sides of the tire tread, with the follower and guide rollers adjustable under spring biasing for centering of the tire in the display.

PATENTED JAN 11 1972

3,633,295

INVENTOR
EDWARD J. STROPKAY

BY Oberlin, Maky, Donnelly & Penner
ATTORNEYS

ROTATING TIRE DISPLAY

This invention relates to an advertising display for automobile tires and has for a primary object the provision of a display which will support a tire and cause it to revolve in place.

Since tires have become increasingly varied with respect to tread profile, width, and configuration, it is also an important object to provide such a display which is not limited in its use by such design differences and, to the contrary, is adaptable to all automobile tires currently marketed.

It is also an object of the invention to provide a rotating tire display which can be economically produced and will support the tire in essentially freestanding unobstructed condition.

Other objects and advantages of the present invention will become apparent as the following description proceeds.

To the accomplishment of the foregoing and related ends the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

Figure 1:
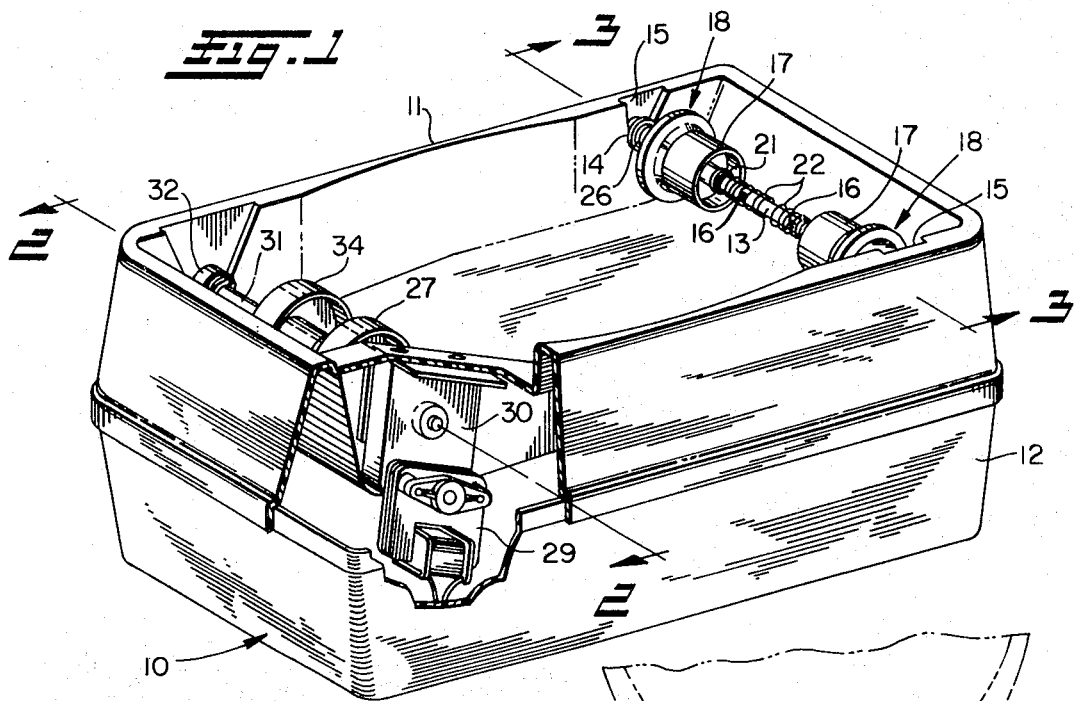
FIG. 1 is a perspective view of a tire display in accordance with the present invention, with a portion broken away for exposure of an inner assembly.

Referring now to the drawing in detail, the preferred form for the display is that of a base adapted to be placed on the floor or a platform and comprising a housing designated generally by reference numeral 10. This housing comprises complemental upper and lower sections 11 and 12 which can very readily be produced in a suitable plastic by vacuum forming.

The upper section 11 is shaped generally as a trough and contains the components for supporting the tire partially therein in an upright condition. These components comprise, at one end portion, a transverse shaft 13 having press nuts 14 at its ends supported in reliefs 15 formed in the sidewalls of the housing. The shaft is provided with two tangs 16 as surface projections respectively to each side of center, and, between each tang and the end nut at the same side, a follower roller 17 and a guide roller 18 are freely rotatably supported on the shaft.

Each follower roller 17 has an integral axially centered disc 19 and a concentric hub 20 which extends integrally from the disc only to the side of the same in the direction of the adjacent tang. A washer 21 overlies the inner end of the hub and a spring 22 is wound closely on the shaft, threadably over the tang 16, and bears against the washer.

Each guide roller 18 is formed with an inner hub portion 23, an intermediate frustoconical portion 24, and an outer annular flange portion 25 at right angles to the shaft axis. It will be noted that the one-sidedness of the follower roller hubs 20 permits overlap or nesting with the guide rollers 18 and hence enhances the proximity of the follower roller face to the guide roller flange at each side. All such rollers are preferably made of nylon or a comparable bearing material, and a second spring 26 is interposed between the nut 14 at each end of the shaft 13 and the guide roller 18 adjacent thereto.

At the other end of the housing, there is a drive roller 27 fixed on a horizontal stub shaft 28 which is driven rotatively by an electric motor 29 through a gear reducer 30, the latter two components being enclosed within the housing 10. Shaft 28 does not extend fully through the hub of the drive roller and a separate continuation shaft 31 is supported at one end therein and at its other end in a ball bearing 32 held in a sidewall seat 33. An idler roller 34 is freely rotatably mounted on the continuation shaft but restrained by a staked washer 35 from moving along the shaft away from the drive roller. These rollers are also preferably made of nylon or the equivalent.

Figure 2:
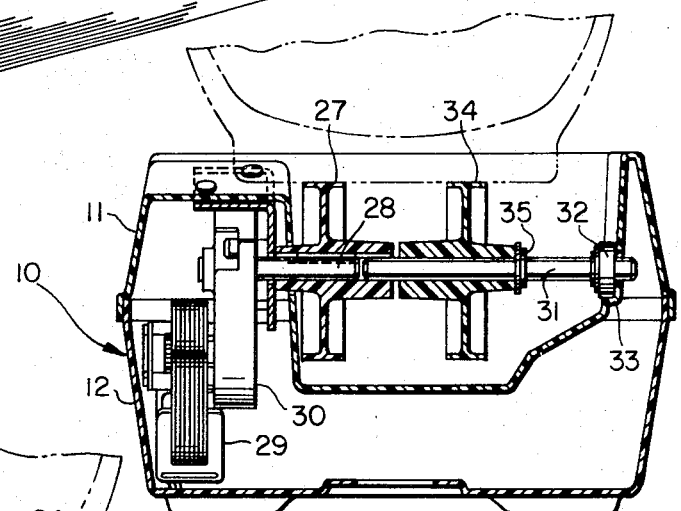
FIG. 2 is a transverse section as viewed from the plane of the line 2—2 in FIG. 1.
Figure 3:
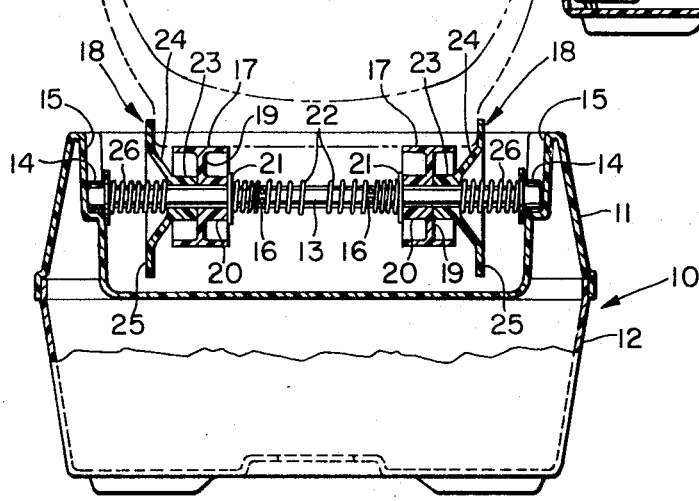
FIG. 3 is a further section as viewed from the plane of the line 3—3 in FIG. 1.

As shown by the phantom tire outlines in FIGS. 2 and 3, the tire to be displayed, either with or without a wheel or simulated wheel, is placed partially within the troughlike top portion of the base housing 10 and rests on drive roller 27, idler roller 34 and the two follower rollers 17. The side faces of the tread are engaged by the guide rollers 18 at their flanges, and these are adjusted transversely of the housing by threadably advancing or retracting the springs 22 on the tangs 16 to the proper width for center tracking of the tire.

While the tire outlines are shown as representing a flat tread, very few tires are actually flat even when this is the intended profile. Accordingly, should there be relative in-and-out movement of the follower rollers 17, they could engage different diameters and the resulting difference in speed at their engagements would cause the tire to shift laterally of the housing and eventually fall over. It is therefore important that the follower rollers be spring loaded in both directions on the shaft as shown to prevent such relative shifting.

The use of an independently rotatable idler roller at the drive end is also significant in such connection, since throwing of the tire can also occur if the two rollers at this end are rotatively locked together and happen to engage different diameters of the tire. Tires sometimes have nonuniform coatings which result in variable friction at the roller engagements, and in this case as well, the use of fixed rollers at the drive end or nonuniform axial migration of follower rollers could be disruptive because of the speed differential in the support which would be certain to occur.

I, therefor, particularly point out and distinctly claim as my invention:

1. A rotating tire display, comprising a base, means carried by the base for supporting the tire in upright standing condition, said means including two pairs of rolling elements arranged respectively on laterally spaced parallel axes on which the tire rests with such axes transverse thereto for such support of the same, the two rolling elements of one such pair being freely independently rotatable and free to move axially toward and away from each other, resiliently deformable means for resisting yieldingly such axial movement of the rolling elements of said one pair, means for mounting a first rolling element of the other pair for free independent rotation, and motor means for driving the second rolling element of the other pair to revolve the tire in its such upright condition.

2. A rotating tire display as set forth in claim 1, including means for adjustably axially separating the rolling elements of said one pair to accommodate variation in tire tread width.

3. A rotating tire display, comprising a base, means carried by the base supporting the tire in upright standing condition, said means including first and second pairs of rolling elements arranged respectively on laterally spaced parallel axes on which the tire rests with such axes transverse thereto fur such support of the same, the two rolling elements of the first pair being freely independently rotatable, means for mounting a first rolling element of the second pair for free independent rotation, motor means for driving the second rolling element of the second pair to revolve the tire in such upright condition, and a third pair of rolling elements disposed to engage respectively opposite sidewall portions of the revolving tire for guiding and centering the same, the rolling elements of said third pair being mounted freely for rotation on the same axis as those of said first pair respectively outboard of the same.

4. A rotating tire display as set forth in claim 3, including spring means for biasing the rolling elements of said one pair axially apart and the elements of the third pair inwardly thereagainst in yielding opposition.

5. A rotating tire display as set forth in claim 4, including means for initially adjusting the axial separation of the rolling elements of said one pair.

* * * * *